(12) United States Patent
Nordström et al.

(10) Patent No.: US 10,021,639 B2
(45) Date of Patent: Jul. 10, 2018

(54) NETWORK NODE AND METHOD PERFORMED THEREBY FOR CONTROLLING OPERATION OF A LOW POWER NODE

(71) Applicant: Telefonaktiebolaget LM Ericsson (publ), Stockholm (SE)

(72) Inventors: Björn Nordström, Solna (SE); Jawad Manssour, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/529,811

(22) PCT Filed: Dec. 19, 2014

(86) PCT No.: PCT/EP2014/078820
§ 371 (c)(1),
(2) Date: May 25, 2017

(87) PCT Pub. No.: WO2016/096049
PCT Pub. Date: Jun. 23, 2016

(65) Prior Publication Data
US 2017/0332320 A1 Nov. 16, 2017

(51) Int. Cl.
*H04W 52/02* (2009.01)
*H04W 84/04* (2009.01)
*G06F 17/30* (2006.01)

(52) U.S. Cl.
CPC ........ *H04W 52/0206* (2013.01); *G06F 17/30* (2013.01); *H04W 52/0232* (2013.01); *H04W 52/0245* (2013.01); *H04W 84/045* (2013.01)

(58) Field of Classification Search
None
See application file for complete search history.

(56) References Cited

U.S. PATENT DOCUMENTS

| 8,989,053 | B1 * | 3/2015 | Skaaksrud | H04W 12/06 370/255 |
| 9,030,941 | B2 * | 5/2015 | Michel | H04W 52/0206 370/229 |
| 2013/0279430 | A1 | 10/2013 | Damnjanovic et al. | |

FOREIGN PATENT DOCUMENTS

EP 2584843 A1 4/2013

OTHER PUBLICATIONS

European Telecommunications Standards Institute, "LTE; Evolved Universal Terrestrial Radio Access (E-UTRA); Radio Resource Control (RRC); Protocol specification (3GPP TS 36.331 version 8.2.0 Release 8)", ETSI TS 136 331 V8.2.0, Nov. 2011, pp. 1-153.

(Continued)

*Primary Examiner* — K. Wong
(74) *Attorney, Agent, or Firm* — Coats & Bennett, PLLC

(57) ABSTRACT

A network node and a method performed thereby for controlling operation of a low power node are provided. The network node and the low power node are operable in a wireless communication network, wherein the low power node has at least two modes of operation, an active mode where the low power node is in full operation, and a passive mode where the low power node is discoverable by wireless devices in the network but not available for initial access or incoming handovers. The method comprises receiving (210) a measurement report from at least one wireless device, the measurement report comprising a measurement related to the low power node; and determining (220) the operation mode of the low power node based on the received measurement report. The method further comprises when the current operation mode of the low power node is passive and the determined operation mode is active, changing (230) the operation mode of the low power node to active mode.

31 Claims, 5 Drawing Sheets

(56) References Cited

OTHER PUBLICATIONS

Mitsubishi Electric, "HeNBs and X2 interface", 3GPP TSG RAN WG3 Meeting #61, Aug. 18-22, 2008, pp. 1-3, Jeju Island, Korea, R3-081948.
Mitsubishi Electric. "3GPP TSG RAN WG3 Meeting #61 Dynamic Setup of HNBs for Energy Savings and Interference Reduction"; 3GPP TSG RAN WG3 Meeting #61; Jeju Island, Korea, Aug. 18-22, 2008; pp. 1-7; R3-081949.

* cited by examiner

NETWORK NODE AND METHOD PERFORMED THEREBY FOR CONTROLLING OPERATION OF A LOW POWER NODE

TECHNICAL FIELD

The present disclosure relates to wireless communication and in particular to controlling operation of a low power node in a wireless communication network.

BACKGROUND

The number of users, wireless communication devices and types of different wireless communication devices is ever increasing. Also the number of different services offered by wireless communication networks is increasing. With this increase, follows increased demands on capacity and resources offered, or provided by, the wireless communication networks.

The amount of generated traffic in different areas may vary substantially during the different hours of the day and night, and the wireless communication networks should be designed in order to handle even the maximum peeks of generated traffic to a satisfactory degree.

The radio coverage of a wireless communication network may also suffer from spots of relatively bad coverage, where the quality of any radio communication may be unsatisfactorily.

In order to cope with high amounts of traffic at certain areas of the wireless communication network and to improve radio coverage at spots of relatively bad coverage, low power nodes may provide increased resources and coverage. A low power node is an access node in a Radio Access Network, RAN, having lower transmission power than a macro node, generally not much higher than 10 W, wherein low power nodes generally have a relatively small coverage area, or cell, compared to macro nodes. Low power nodes are generally placed within coverage areas of macro nodes in order to boost signal quality and radio resources of small areas within macro cells. However, low power nodes may also be placed outside the coverage area of a macro node in order to provide radio coverage where it does not exist In areas of sometimes relatively high amount of generated traffic at various peak hours of the day, there may also be hours of the day with relatively low amount of generated traffic. During hours of relatively low amount of generated traffic, the low power nodes may not be needed. If not needed, having them fully active and ready to serve wireless devices of users thereof, may result in unnecessary power consumption.

SUMMARY

The object is to obviate at least some of the problems outlined above. In particular, it is an object to provide a network node and a method performed thereby for controlling operation of a low power node. These objects and others may be obtained by providing a network node and a method performed by a network node according to the independent claims attached below.

According to an aspect a method performed by a network node is provided. The network node and the low power node are operable in a wireless communication network, wherein the low power node has at least two modes of operation, an active mode where the low power node is in full operation, and a passive mode where the low power node is discoverable by wireless devices in the network but not available for initial access or incoming handovers. The method comprises receiving a measurement report from at least one wireless device, the measurement report comprising a measurement related to the low power node; and determining the operation mode of the low power node based on the received measurement report. The method further comprises when the current operation mode of the low power node is passive and the determined operation mode is active, changing the operation mode of the low power node to active mode.

According to an aspect, a network node is provided. The network node and the low power node are operable in a wireless communication network, wherein the low power node has at least two modes of operation, an active mode where the low power node is in full operation, and a passive mode where the low power node is discoverable by wireless devices in the network but not available for initial access or incoming handovers. The network node is configured for receiving a measurement report from at least one wireless device, the measurement report comprising a measurement related to the low power node; and determining the operation mode of the low power node based on the received measurement report. The network node further is configured for: when the current operation mode of the low power node is passive and the determined operation mode is active, changing the operation mode of the low power node to active mode.

The network node and the method performed thereby may have several advantages. One possible advantage is that the energy impact from deployments with large number of low power nodes can be reduced when a dynamic control of an energy saving mode is used. That is, in the wireless communication network, only the low power nodes that are beneficial to use at a specific time are configured to use its full power consumption whereas the nodes that for the moment are deemed unnecessary to use have lower consumption.

BRIEF DESCRIPTION OF DRAWINGS

Embodiments will now be described in more detail in relation to the accompanying drawings, in which.

DETAILED DESCRIPTION

Briefly described, a network node and a method performed by the network node for controlling operation of a low power node are provided, wherein the network node and the low power node being operable in a wireless communication network, wherein the low power node has at least two modes of operation, an active mode where the low power node is in full operation, and a passive mode where the low power node is discoverable by wireless devices in the network but not available for initial access or incoming handovers.

By analysing, or determining, different current characteristics and/or conditions relating to the wireless communication network, and especially with regard to the low power node and/or a macro node associated with, or in control of, the low power node, the network node is enabled to determine which operation mode is appropriate for the low power node.

A small cell is fundamentally similar to a normal macro cell, but defined by having a smaller coverage area. A small cell is a coverage area of a low power node and a macro cell is a coverage area of a macro node. As such the small cell coverage can be provided by a network node having lower transmitted power, i.e. a low power node.

Small cells may be deployed to enhance coverage in locations where the signal strength from normal macro cells is weak, or inside a macro cell, for example at hotspots, to increase capacity and overall Quality-of-Experience, QoE, of users in the network. The low power node could be using the same radio access technology, RAT, and carrier frequency as the macro node in the network, or using different carrier frequency and/or a different RAT. In many of these cases, support for seamless mobility is defined by the RAT standard.

Embodiments herein relate to a method performed by a network node for controlling operation of a low power node, the network node and the low power node being operable in a wireless communication network, wherein the low power node has at least two modes of operation, an active mode where the low power node is in full operation, and a passive mode where the low power node is discoverable by wireless devices in the network but not available for initial access or incoming handovers. Embodiments of such a method will now be described with reference to FIG. 2, which is a flowchart of such a method according to an exemplifying embodiment.

Figure 2:
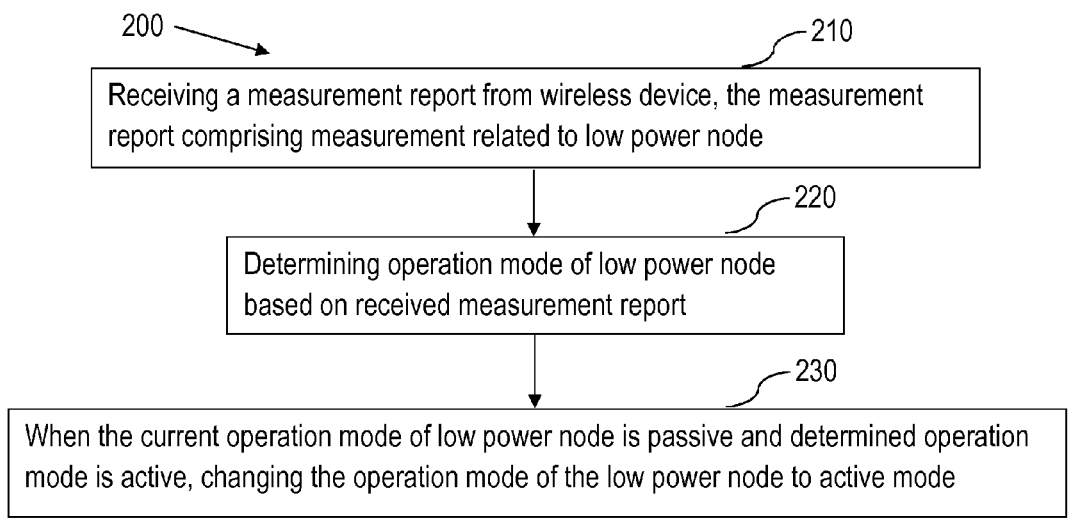
FIG. 2 is a flowchart of a method performed by a network node for controlling operation of a low power node according to an exemplifying embodiment.

FIG. 2 illustrates the method comprising receiving 210 a measurement report from at least one wireless device, the measurement report comprising a measurement related to the low power node; and determining 220 the operation mode of the low power node based on the received measurement report. The method further comprises when the current operation mode of the low power node is passive and the determined operation mode is active, changing 230 the operation mode of the low power node to active mode.

The network node in control of the low power node may be serving a plurality of wireless devices, either directly or indirectly. Low power nodes and macro nodes generally transmit pilot signals or reference signals on which the wireless devices may perform different measurements. The different measurements reflect e.g. channel quality between the wireless device and the node that transmitted the signal. The measurements enable the network node, the macro node or the low power node to determine e.g. different parameters associated with transmission and/or reception to/from the respective node and the wireless device.

The wireless devices being served by, or connected to the macro node may perform measurements on the pilot signals or reference signals that they can receive. The wireless devices then send the measurement reports to the macro node. Thus, the method comprises receiving a measurement report from at least one wireless device. In the measurement reports, results from measurements performed on pilot signals or reference signals received from the low power node are comprised.

The network node may then analyse the received measurement report and determine the operation mode of the low power node based on the received measurement report. The measurement report may tell the network node that the wireless device receives the pilot signals or reference signals transmitted from the low power node with good signal strength or bad signal strength, wherein the network node may deduce that the wireless device is relatively close or relatively far from the low power node and/or that the low power node would be able to advantageously or disadvantageously serve the wireless device. Thus, at least based on the received measurement report from the at least one wireless device, the network node determines the operation mode of the low power node.

The network node may then change the operation mode of the low power node to active mode when the current operation mode of the low power node is passive and the determined operation mode is active. The low power node may either be in passive mode or active mode. Thus, if the low power node already is in active mode when the network node determines that its operation mode should be active, nothing needs to be done. However, if the low power node is in passive mode and the network node determines that the operation mode of the low power node is to be active, the network node changes the operation mode to the active mode. This may be done by the network node sending a signal to the low power node instructing the low power node to change its operation mode to the active mode. The signal may be sent e.g. on an X2 interface or and S1 interface in case the wireless network employs the Long Term Evolution, LTE, technology.

The method performed by the network node may have several advantages. One possible advantage is that the energy impact from deployments with large number of low power nodes can be reduced when a dynamic control of an energy saving mode is used. That is, in the wireless communication network, only the low power nodes that are beneficial to use at a specific time are configured to use its full power consumption whereas the nodes that for the moment are deemed unnecessary to use have lower consumption.

Many different factors and characteristics may be used alone or in combination with others as input in order to determine the operation mode of the low power node as will be explained and exemplified below.

In an example, determining 220 the operation mode of the low power node is based on a relationship between the received signal strength associated with the low power node versus the received signal strength associated with a macro node.

The received measurement report provides information pertaining to received signal strength for signal received from the low power node and also received signal strength for signal received from the macro node. Generally, the macro node transmits its signals with a transmission power that is substantially stronger, or higher, than the transmission power with which the low power node transmits its signals.

The network node receives the measurement report informing the network node about the received signal strength that the wireless device receives signals from the macro node and the low power node respectively. Thus the network node may determine the relationship between the received signal strength associated with the low power node versus the received signal strength associated with a macro node. The relationship may for example be a ratio between received signal strength of signals received from the macro node and signals received from the low power node.

The network node may compare this relationship with a threshold and depending on whether the relationship is below or above the threshold the network node determines the operation mode of the low power node. Merely as an example, if the relationship between the received signal strength associated with the low power node versus the received signal strength associated with a macro node is determined as received signal strength of signals received from the macro node, $P_{macro}$, divided by received signal strength of signals received from the low power node, $P_{LP}$, then the comparison with the threshold, T, may be: if $P_{macro}/P_{LP} > T$, then the operation mode of the low power node is passive mode, and if $P_{macro}/P_{LP} \leq T$, then the operation mode of the low power node is active mode.

In another example, determining 220 the operation mode of the low power node is also based on the number of wireless devices from which measurement reports comprising measurements with regards to the low power node have been received.

There may be a varying number of wireless devices connected to, or served by, the macro node from which the network node may receive measurement reports. Of these wireless devices, some may be able to receive signals transmitted from the low power node and some may not be able to receive signals transmitted from the low power node.

Thus, the network node may determine the operation mode of the low power node also based on the number of wireless devices from which measurement reports comprising measurements with regards to the low power node have been received. In case the network node receives relatively many measurement reports comprising measurements with regards to the low power node, the network node may determine that it would be beneficial to have the low power node operating in active mode in order to offload the macro node. On the other hand, in case the network node receives relatively few measurement reports comprising measurements with regards to the low power node, the network node may determine that it would be a waste of energy to have the low power node operating in active mode and thus may determine to have the low power node in passive mode.

The network node may additionally take into account the total number of wireless devices from which it receives measurement reports as the total number of wireless devices from which it receives measurement reports may serve as an indication of a load the network node, or macro node, is experiencing. If the network node receives relatively few measurement reports comprising measurements with regards to the low power node from wireless devices, but the macro node has a relatively high number of wireless devices connected to it since the network node receives a relatively high amount of measurement reports, the network node may determine to have the low power node in active mode in order to offload the macro node even if the offload is not very substantial.

Yet further, the network node may compare a current number of received measurement reports comprising measurements with regards to the low power node and optionally also the total number of received measurement reports to a previously received (e.g. 10, 30, or 60 minutes ago) number of received measurement reports comprising measurements with regards to the low power node and optionally also the total number of received measurement reports. If there is an increase in the number of received measurement reports, the network node may determine to have the low power node in active mode.

In still an example, determining 220 the operation mode of the low power node is also based on the frequency with which measurement reports are received.

The wireless device(s) which are connected to, or served by, the macro node may the send measurement reports relatively often or relatively seldom.

If the network node receives measurement reports comprising measurements with regards to the low power node relatively often from wireless device(s), the network node may determine to have the low power node in active mode. If the network node receives measurement reports comprising measurements with regards to the low power node relatively seldom from wireless device(s), the network node may determine to have the low power node in passive mode.

Some wireless devices may send measurement reports repeatedly many times during a time interval and other wireless devices may send measurement reports e.g. once during the same time interval. The network node may configure how often a wireless device should send measurement reports, e.g. only triggered during certain conditions (e.g. poor radio coverage or the wireless devices receives signals from other network nodes at relatively strong received signal strength) or periodically. The network node may also configure number of measurement reports the wireless device should send etc.

In yet an example, determining 220 the operation mode of the low power node is also based on Quality of Service, QoS, parameters of the wireless device from which the measurement report is received.

The wireless device that sent the measurement report to the network node may be engaged in different services. Different services have different QoS. For example, speech calls have different requirements on e.g. latency in the network than sending/receiving a file of data e.g. an email.

Thus, in case the wireless device in engaged in a service, wherein the QoS parameters do not allow for e.g. latency, then the network node may determine to have the low power node in active mode in order to fulfil the requirements as set forth in the QoS parameters. Alternatively, in case the wireless device in engaged in a service, wherein the QoS parameters allow for e.g. latency, then the network node may determine to have the low power node in passive wherein the requirements as set forth in the QoS parameters may still be fulfilled.

In another example, determining 220 the operation mode of the low power node is also based on a priority level of the wireless device(s) that sent the measurement report(s)

Different wireless devices may have different priorities, e.g. by means of a subscription type associated with the wireless device. There may be subscriptions that make the user of the wireless device to be a priority subscriber, wherein the demands on the services may be higher than for another low-priority subscription.

In case the receive measurement report was transmitted from a wireless device associated with a high priority level, the network node may determine to have the low power node in active mode in order to meet the priority and quality requirements of that wireless device. Likewise, in case the receive measurement report was transmitted from a wireless device associated with a low priority level, the network node may determine to have the low power node in passive mode and still meet the priority and quality requirements of that wireless device.

In still an example, determining 220 the operation mode of the low power node is also based on a current load of a macro node being associated with the low power node.

As mentioned above, the macro node may be more or less loaded, e.g. by the number of wireless devices connected to it, by the usage ratio of its radio resources, and/or the level of free capacity of its internal buffers and processors. The low power node is generally placed within a coverage area of the macro node, wherein the macro node controls, or is associated with, the low power node.

Thus, if the macro node is relatively highly loaded, the network node may determine to have the low power node in active mode in order to offload the macro node, wherein some of the wireless devices currently being connected to, or served by, the macro node may be handed over to the low power node.

In yet another example, determining 220 the operation mode of the low power node is also based on a current QoS state for a plurality of wireless devices in a cell of a macro node being associated with the low power node.

There may be a plurality of wireless devices being engaged in services associated with relatively high QoS parameters, also referred to QoS state. Even if the received measurement report was sent by a wireless device not being engaged in a service associated with relatively high QoS parameters, the network node may still determine to have the low power node in active mode. This in order to offload the macro node and thus reducing the risk of the macro node not being able to fulfil the requirements of the wireless devices being engaged in services associated with relatively high QoS parameters.

It may be that the macro node is relatively highly loaded, and even if one or a plurality of measurement reports is/are received from wireless devices not being engaged in a service associated with relatively high QoS parameters, handing over such wireless devices to the low power node will free capacity of the macro node that may be used by the other wireless devices not being handed over to the low power node.

In still an example, determining 220 the operation mode of the low power node is also based on a potential capacity increase and/or enhancement of QoS for a number of wireless devices in a cell of a macro node being associated with the low power node, if the operation mode of the low power node is changed to active mode.

The network node has information of the capacity or resources that may be provided by the low power node, as well as the macro node. Consequently, the network node may determine the operation mode of the low power node based on the potential capacity increase and/or enhancement of QoS for a number of wireless devices in the cell of the macro node being associated with the low power node.

The network node may also look at the current capacity or resource usage of the macro node and if the capacity or resource usage of the macro node is above a first threshold, the network node may determine to have the low power node in passive mode. However, if the capacity or resource usage of the macro node is above a second threshold, the network node may determine to have the low power node in active mode based on the potential capacity increase and/or enhancement of QoS for a number of wireless devices in the cell of the macro node being associated with the low power node, if the operation mode of the low power node is changed to active mode.

In yet another example, determining 220 the operation mode of the low power node is also based on a difference in power consumption of the low power node with regard to the active and the passive mode.

The network node may further take the power consumption of the low power node with regard to the active and the passive mode into account when determining the operation mode of the low power node.

Different low power nodes may have different power consumption in active mode, and also in passive mode. There are different examples of low power nodes, e.g. micro nodes, pico nodes, home nodes, etc. having different low transmission powers. Thus, some low power nodes may have a larger different between active mode and passive mode than other low power nodes.

Consequently, the network node bases its decision of operation mode of the low power node on the difference in power consumption of the low power node with regard to the active and the passive mode. If the difference is relatively small, the network node may decide to have the low power node in active mode, especially of the macro node is relatively highly loaded or if it has several wireless devices connected to it being located relatively far away from the macro node.

The bigger the difference in power consumption of the low power node with regard to the active and the passive mode, the more reluctant the network node is to have the low power node in active mode, unless necessary based on other parameters, e.g. any ones of those discussed above.

In yet an example, determining 220 the operation mode of the low power node is also based on a frequency band by means of which the wireless device(s) is/are associated with a macro node.

The macro node may have one or more frequency bands. Generally, a coverage area of a frequency band is said to be a cell. Consequently, a wireless device may be handed over from one cell, i.e. frequency band, to another within the same macro node.

Different frequency bands may have different characteristics. More wireless devices may be connected to, or served by, the macro node by means of one frequency band, A, compared to another frequency band, B. The different frequency bands A and B may not have 100% geographic overlap and thus one frequency band, e.g. A, may have better radio coverage overlapping with the coverage area of the low power node than a second frequency band, e.g. B.

Merely as an example, assume that frequency band A having 100% geographic overlap with the coverage area of the low power node. Assume further that the resources of frequency band A is used to a high degree such that no more wireless devices should, or may, be served by the macro by means of frequency band A. Still further, assume that one or more measurement reports is/are received from wireless devices(s) connected to, or served by, the macro node by means of frequency band B, which has less than 100% geographic overlap with the coverage area of the low power node. If so, the network node may determine to have the low power node in active mode in order for the network to better provide service to the wireless devices(s) from which the measurement report(s) were/was received.

To illustrate another example, frequency band A and frequency band B may or may not have 100% geographic overlap with the coverage area of the low power node. However, if the wireless device is connected to, or served by, e.g. frequency band A then that may be a criteria for activating the low power node, whereas if it is connected to another frequency band B the network node may choose to not activate the low power node. There may be another function in the network node (e.g. load balancing between bands) that has actively decided that wireless devices should be connected to a band B, and it may then not be good to activate the low power node if that means the wireless device would change frequency.

According to an embodiment, determining 220 the operation mode of the low power node is performed at different time intervals; at different times during a day and night; and/or at the reception of any measurement report from any wireless device, the measurement report comprising a measurement with regards to the low power node.

The volume of traffic is generally changing during the day and night. There are different so-called peak hours during the day and night, and consequently also time periods of relatively low amount of traffic. The type of traffic, e.g. speech, email, streaming of audio and/or video content, varies during the day and night.

Thus, the network node may determine the operation mode of the low power node at different set hours during the day and night, e.g. at 8 am, noon, 5 pm and 9 pm. Alternatively, network node may determine the operation mode of the low power node at regular time intervals, e.g. 7 am., 9 am., 11 am., 1 pm., 3 pm., etc. Still alternatively, the network node may determine the operation mode of the low power node at the reception of any measurement report from any wireless device, the measurement report comprising a measurement with regards to the low power node.

According to an embodiment, the network node is a macro node being in control of the low power node.

The method may be performed in different nodes in the wireless communication network. One example is the macro node that is in control of the low power node.

The macro node generally receives measurement reports from the wireless devices that are served by, or connected to, the macro node. Thus the macro node will receive all the measurement information necessary to perform the method.

According to yet an embodiment, the network node is a Radio Network Controller, RNC, being in control of the low power node.

The macro and low power nodes may be connected to, and controlled by, the RNC. The macro node may thus forward the received measurement reports from the wireless devices to the RNC. The RNC may then perform the method and e.g. order the macro node to instruct the low power node to change to the active mode.

According to still an embodiment, the network node is comprised in an Operation, Administration and Maintenance, OAM, system.

The wireless communication system generally comprises an OAM system. The OAM system generally comprises processes, activities, tools, etc. involved in operating, administering, managing and maintaining the wireless communication system.

The macro node receiving the measurement reports may then forward the received measurement reports to the OAM system, thereby providing the necessary information to the OAM.

The passive mode may comprise the low power node only transmitting reference signals in order to be detectable by wireless devices, and the uplink receiver chain being switched off.

The passive mode may comprise the low power node only transmitting reference signals on a limited part of the whole available bandwidth in order to be detectable by wireless devices, and the uplink receiver chain being switched off.

The passive mode may comprise the low power node only transmitting Multicast Broadcast Single Network, MBSFN, subframes in order to be detectable by wireless devices, and the uplink receiver chain being switched off.

A passive mode of a network base station, or node, is in this disclosure used as the term for a base station that is discoverable by wireless devices in the network, but not available for initial access or incoming handovers. In LTE this may be achieved by transmitting the cell-specific reference signals, as well as any necessary downlink control information (e.g. broadcast system information) but at the same time setting the idle mode mobility parameters in ways such that the wireless device are not allowed to connect to the node. In addition, no other nodes in the network initiate connected mode mobility to the passive node. An active mode of a network base station, or node, is used as the term for a base station that is configured for normal operation, i.e. accepting initial access or incoming handovers.

In a base station, or node, configured in the above defined passive mode the potential for energy savings may be large. One energy saving potential is expected to be that the amount of processing needed to maintain the passive mode when compared to a normal operation. As such, the processing capacity, e.g. number of processors or memory, that needs to be active in the concerned node can be reduced to a minimum and therefore allowing energy savings. Other examples are to temporarily reduce operating bandwidth when using the passive mode. For example, a node that has a normal operating bandwidth of 10 MHz may during this passive mode be configured to use only 1.4 MHz or 3 MHz transmission bandwidth. Another example of reducing the energy of an LTE base station, or node, is to configure Multicast Broadcast Single Frequency Network, MBSFN, subframes which lead to reduced energy due to the relaxed requirements to transmit Cell-specific Reference Signals, CRS, in such subframes. One further reduction in power consumption may be achieved by turning off the uplink receiver chain since the node that is in passive mode has no wireless devices connected to it and thus does not need to process any signals sent in uplink.

A wireless device may be configured to send measurement reports when certain events occur. In normal scenarios, where all nodes are in active mode all of the time, such measurement reports are used for connected mode mobility, i.e. to be able to handover wireless devices without service interruption. For example, an event referred to as A4 may be used for instructing the wireless device to send a measurement report if the signal quality of a neighbouring LTE cell exceeds a pre-configured threshold. Another event, referred to as event B1 may be used for instructing the wireless device to send a measurement report if the signal quality of a neighbouring cell of another technology (Global System for Mobile Communication Enhanced Data rates for Global Evolution Radio Access Network: GERAN, Universal Mobile Telecommunications System Terrestrial Radio Access: UTRA) exceeds a pre-configured threshold. Still another event, referred to as event A3 is configured the UE reports the signal quality if the neighbour cell is perceived to have a certain level better signal quality than the current cell.

Figure 1:
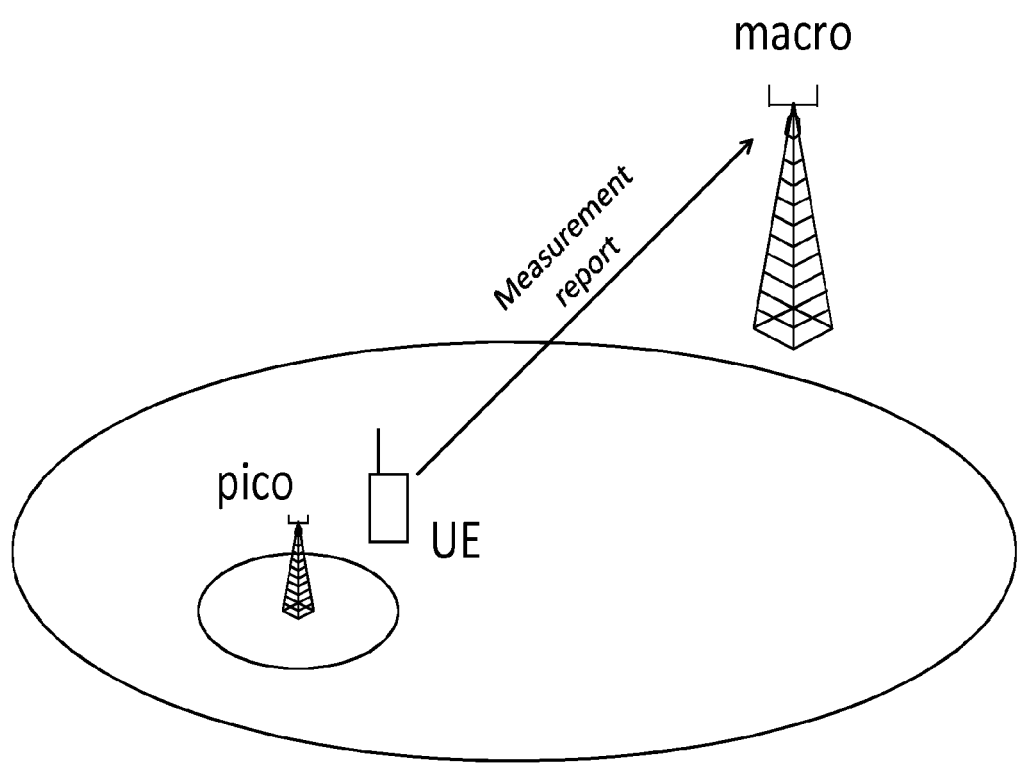
FIG. 1 is an illustration of a low power node (pico) in passive mode deployed within coverage of a macro node

It is assumed that when the low power node is in passive mode, network coverage is provided by one or more macro cells such that the measurement reports can be signalled to the network node. FIG. 1, illustrates a wireless device, e.g. a UE, being connected to a macro node and approaches a low power (pico) node and therefore signals a measurement (A4 or B1) report towards the macro with information about signal reception quality from the pico node.

Figure 3:
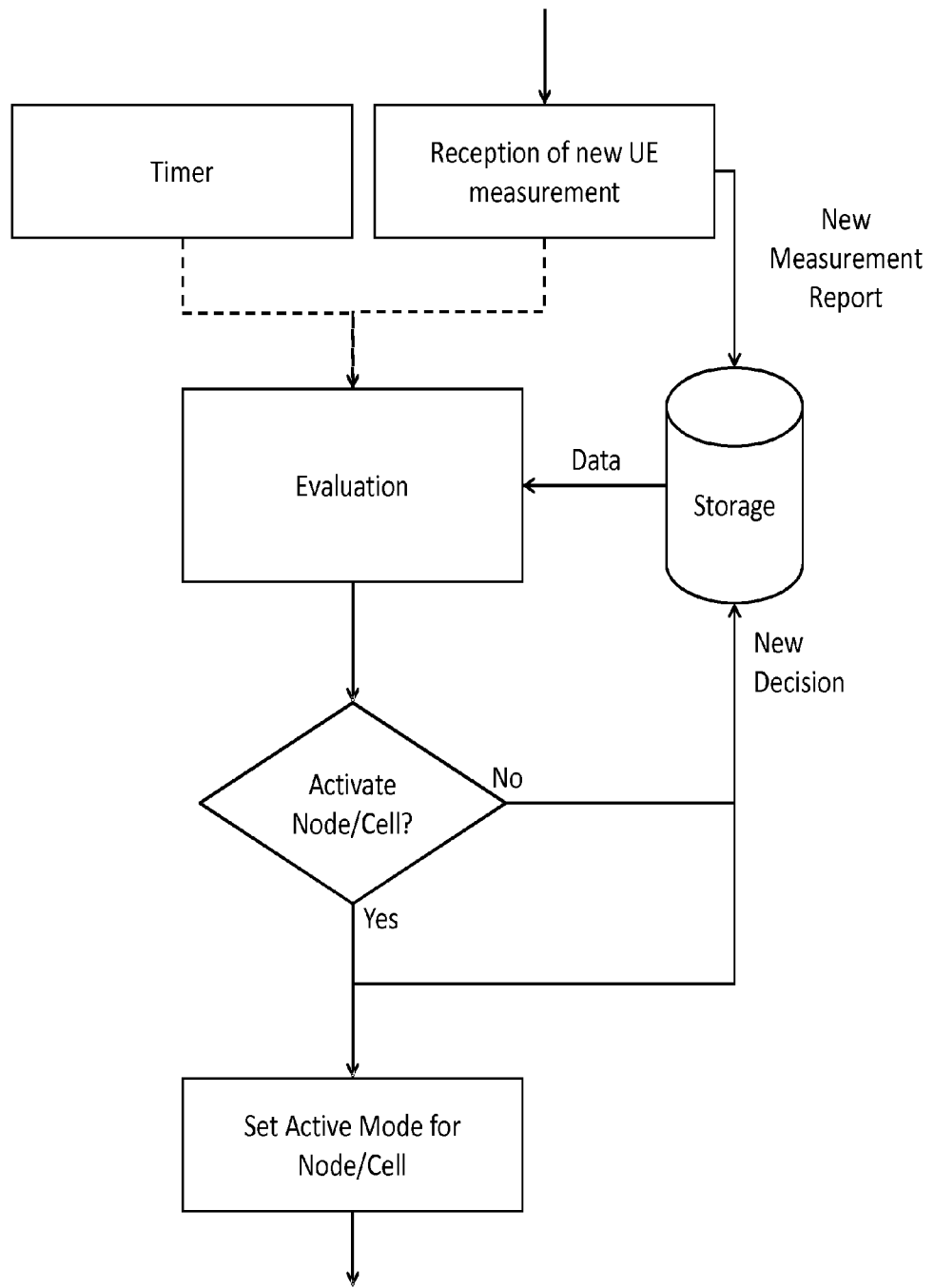
FIG. 3 is a flowchart of a method performed by a network node for controlling operation of a low power node according to yet an exemplifying embodiment.

FIG. 3 is a flow chart of an exemplifying embodiment of the method that controls if activation of a passive node should be done. At reception of a measurement report the network node stores the information and at the same time triggers the evaluation algorithm that decides if the low power node should be activated or not. The decision is also fed back to the storage for use in future executions of the evaluation method. The method may take into account one or more of:

The coverage from the low power node as indicated in the measurement report(s) from the wireless device(s).

The number of wireless devices that have sent measurement report(s) that indicate coverage from the passive low power node.

QoE (e.g. bit rate, packet loss rate) specifically of the wireless device(s) that have sent the measurement report.

Load in the macro cell (a coverage area of a frequency band of the macro node) now serving the wireless device(s) and state of QoE for all wireless devices in the macro cell.

Potential capacity increase, and/or enhancement of QoE, if activating the low power node.

Energy consumption of the low power node in active and/or passive state.

The evaluation step may also be periodically triggered by a timer or similar functionality. The measurement report from the wireless device may be processed in the receiving node or relayed to any other node in the network or to an external processing node. As such, the implementation of the method having control of the energy mode of a low power node may be implemented in the low power node itself, in the direct receiver of the measurement, in a master control software (base station or other type of node) or in any external implementation, e.g. as a cloud based software.

Deactivation of the low power node, i.e. setting the node into passive mode may be done based on different premises, e.g. checking the number of connected users or radio resource usage in the small cell of the low power node (if below than a certain threshold).

Embodiments herein also relate to a network node for controlling operation of a low power node, the network node and the low power node being operable in a wireless communication network, wherein the low power node has at least two modes of operation, an active mode where the low power node is in full operation, and a passive mode where the low power node is discoverable by wireless devices in the network but not available for initial access or incoming handovers.

The network node has the same technical features, objects and advantages as the method performed by the network node as described above. The network node will only be described in brief in order to avoid unnecessary repetition.

The network node will be described with reference to FIGS. 4 and 5, which both are block diagrams illustrating exemplifying embodiments of the network node.

Figure 4:
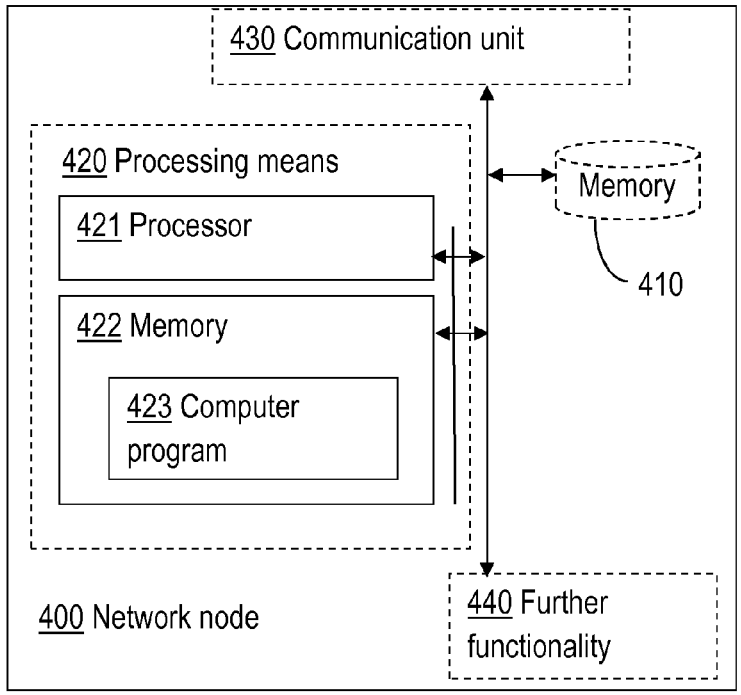
FIG. 4 is a block diagram of a network node for controlling operation of a low power node according to an exemplifying embodiment.
Figure 5:
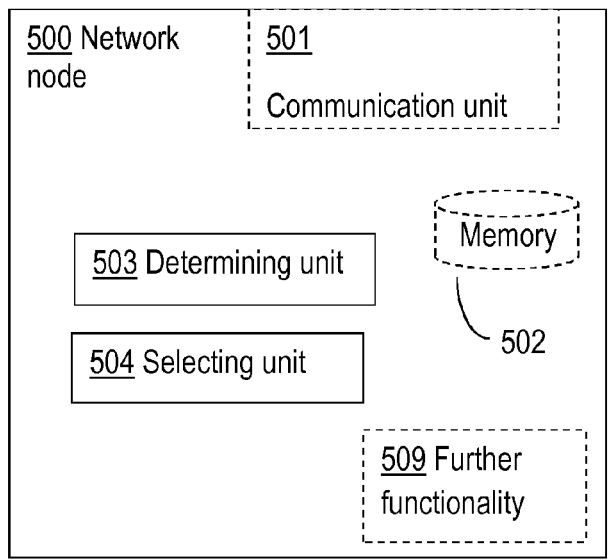
FIG. 5 is a block diagram of a network node for controlling operation of a low power node according to still an exemplifying embodiment.

FIGS. 4 and 5 illustrate the network node 400, 500 being configured for receiving a measurement report from at least one wireless device, the measurement report comprising a measurement related to the low power node; and determining the operation mode of the low power node based on the received measurement report. The network node 400, 500 further is configured for: when the current operation mode of the low power node is passive and the determined operation mode is active, changing the operation mode of the low power node to active mode.

The network node 400, 500 may be implemented or realised in different ways. An exemplifying implementation is illustrated in FIG. 4. FIG. 4 illustrates the network node 400 comprising a processor 421 and memory 422, the memory comprising instructions, e.g. by means of a computer program 423, which when executed by the processor 21 causes the network node 400 to receive a measurement report from at least one wireless device, the measurement report comprising a measurement related to the low power node; and to determine the operation mode of the low power node based on the received measurement report. The memory further comprises instructions which when executed by the processor 21 causes the network node 400 to change the operation mode of the low power node to active mode when the current operation mode of the low power node is passive and the determined operation mode is active mode.

FIG. 4 also illustrates the network node 400 comprising a memory 410. It shall be pointed out that FIG. 4 is merely an exemplifying illustration and memory 410 may be optional, be a part of the memory 422 or be a further memory of the network node. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes or entities of the communication network as well as wireless device of the communication network. FIG. 4 also illustrates the network node 400 comprising further functionality 440. The further functionality 440 may comprise hardware of software necessary for the network node 400 to perform different tasks that are not disclosed herein. Merely as an illustrative example, the further functionality may comprise a scheduler for scheduling transmissions from the network node 400 and/or for transmissions from wireless devices with which the network node 400 communicates with.

An alternative exemplifying implementation of the network node 400, 500 is illustrated in FIG. 5. FIG. 5 illustrates the network node 500 comprising a receiving unit 503 for receiving a measurement report from at least one wireless device, the measurement report comprising a measurement related to the low power node. The network node 500 also comprises a determining unit 504 for determining the operation mode of the low power node based on the received measurement report. The network node 500 also comprises an operation unit 505 for changing the operation mode of the low power node to active mode when the current operation mode of the low power node is passive and the determined operation mode is active mode.

In FIG. 5, the network node 500 is also illustrated comprising a communication unit 501. Through this unit, the network node 500 is adapted to communicate with other nodes and/or entities in the wireless communication network. The communication unit 501 may comprise more than one receiving arrangement. For example, the communication unit 501 may be connected to both a wire and an antenna, by means of which the network node 500 is enabled to communicate with other nodes and/or entities in the wireless communication network. Similarly, the communication unit 501 may comprise more than one transmitting arrangement, which in turn is connected to both a wire and an antenna, by means of which the network node 500 is enabled to communicate with other nodes and/or entities in the wireless communication network. The network node 500 further comprises a memory 502 for storing data. Further, the network node 500 may comprise a control or processing unit (not shown) which in turn is connected to the different units 503-505. It shall be pointed out that this is merely an illustrative example and the network node 500 may comprise more, less or other units or modules which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

Although the code means in the respective embodiments disclosed above in conjunction with FIG. 5 are implemented as computer program modules which when executed in the respective processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The network node has the same possible advantages as the method performed by the network node. One possible advantage is that the energy impact from deployments with large number of low power nodes can be reduced when a dynamic control of an energy saving mode is used. That is, in the wireless communication network, only the low power nodes that are beneficial to use at a specific time are configured to use its full power consumption whereas the nodes that for the moment are deemed unnecessary to use have lower consumption.

According to an embodiment, the network node is further configured for determining the operation mode of the low power node also based on a relationship between the received signal strength associated with the low power node versus the received signal strength associated with a macro node.

According to still an embodiment, the network node is further configured for determining the operation mode of the low power node also based on the number of wireless devices from which measurement reports comprising measurements with regards to the low power node have been received.

According to yet an embodiment, the network node is further configured for determining the operation mode of the low power node also based on the frequency with which measurement reports are received.

According to a further embodiment, the network node is further configured for determining the operation mode of the low power node also based on QoS parameters of the wireless device from which the measurement report is received.

According to another embodiment, the network node is further configured for determining the operation mode of the low power node also based on a priority level of the wireless device(s) that sent the measurement report(s).

According to yet an embodiment, the network node is further configured for determining the operation mode of the low power node also based on a current load of a macro node being associated with the low power node.

According to still an embodiment, the network node is further configured for determining the operation mode of the low power node also based on a current QoS state for a plurality of wireless devices in a cell of a macro node being associated with the low power node.

According to another embodiment, the network node is further configured for determining the operation mode of the low power node also based on a potential capacity increase and/or enhancement of QoS for a number of wireless devices in a cell of a macro node being associated with the low power node, if the operation mode of the low power node is changed to active mode.

According to yet an embodiment, the network node is further configured for determining the operation mode of the low power node also based on a difference in power consumption of the low power node with regard to the active and the passive mode.

According to a further embodiment, the network node is further configured for determining the operation mode of the low power node also based on a frequency band by means of which the wireless device(s) is/are associated with a macro node.

According to yet an embodiment, the network node is further configured for determining the operation mode of the low power node at different time intervals; at different times during a day and night; and/or at the reception of any measurement report from any wireless device, the measurement report comprising a measurement with regards to the low power node.

The network node 400, 500 is in a first example, a macro node being in control of the low power node.

The network node 400, 500 is in a second example, an RNC being in control of the low power node.

The network node 400, 500 is in a third example, comprised in an OAM system.

Figure 6:
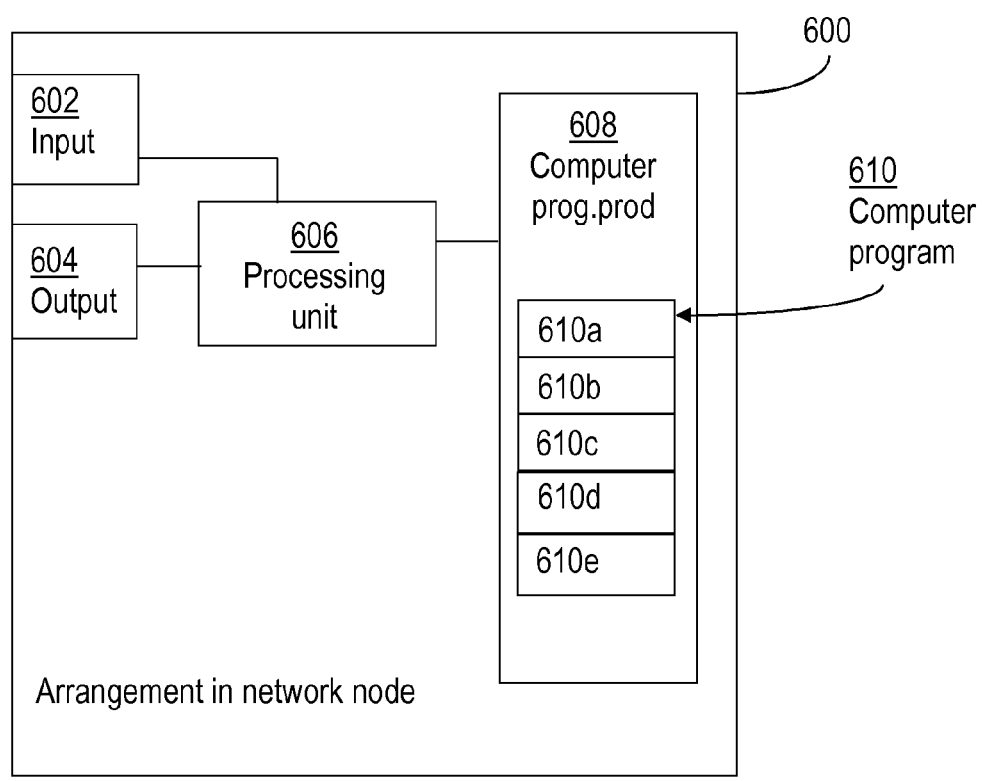
FIG. 6 is a block diagram of an arrangement in a network node for controlling operation of a low power node according to an exemplifying embodiment.

FIG. 6 schematically shows an embodiment of an arrangement 600 in a network node 500. Comprised in the arrangement 600 in the network node 500 are here a processing unit 606, e.g. with a Digital Signal Processor, DSP. The processing unit 606 may be a single unit or a plurality of units to perform different actions of procedures described herein. The arrangement 600 in the network node may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement 600 in the network node comprises at least one computer program product 608 in the form of a non-volatile memory, e.g. an Electrically Erasable Programmable Read-Only Memory, EEPROM, a flash memory and a hard drive. The computer program product 608 comprises a computer program 610, which comprises code means, which when executed in the processing unit 606 in the arrangement 600 in the network node causes the network node to perform the actions e.g. of the procedure described earlier in conjunction with FIG. 2.

The computer program 610 may be configured as a computer program code structured in computer program modules 610a-610e. Hence, in an exemplifying embodiment, the code means in the computer program of the network node comprises a receiving unit, or module, for receiving a measurement report from at least one wireless device, the measurement report comprising a measurement related to the low power node. The computer program further comprises a determining unit, or module, for determining the operation mode of the low power node based on the received measurement report. Still further, the computer program further comprises a mode changing unit, or module for changing the operation mode of the low power node to active mode when the current operation mode of the low power node is passive and the determined operation mode is active mode The computer program modules could essentially perform the actions of the flow illustrated in FIG. 2, to emulate the network node 500. In other words, when the different computer program modules are executed in the processing unit 606, they may correspond to the units 503-505 of FIG. 5.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a network node, for controlling operation of a low power node, the network node and the low power node being operable in a wireless communication network, wherein the low power node has at least two modes of operation including an active mode where the low power node is in full operation and a passive mode where the low power node is discoverable by wireless devices in the network but not available for initial access or incoming handovers, the method comprising:

receiving a measurement report from at least one wireless device, the measurement report comprising results from measurements performed on signals received by the wireless device from the low power node;

determining the operation mode of the low power node based on the received measurement report; and changing, when the current operation mode of the low power node is passive and the determined operation mode is active, the operation mode of the low power node to the active mode.

2. The method of claim 1, wherein the determining the operation mode of the low power node is based on a relationship between the received signal strength associated with the low power node versus the received signal strength associated with a macro node.

3. The method of claim 1, wherein the determining the operation mode of the low power node is based on the number of wireless devices from which measurement reports comprising measurements with regards to the low power node have been received.

4. The method of claim 1, wherein the determining the operation mode of the low power node is based on the frequency with which measurement reports are received.

5. The method of claim 1, wherein the determining the operation mode of the low power node is based on Quality of Service parameters of the wireless device from which the measurement report is received.

6. The method of claim 1, wherein the determining the operation mode of the low power node is based on a priority level of the wireless device(s) that sent the measurement report(s).

7. The method of claim 1, wherein the determining the operation mode of the low power node is based on a current load of a macro node being associated with the low power node.

8. The method of claim 1, wherein the determining the operation mode of the low power node is based on a current Quality of Service state for a plurality of wireless devices in a cell of a macro node being associated with the low power node.

9. The method of claim 1, wherein the determining the operation mode of the low power node is based on a potential capacity increase and/or enhancement of Quality of Service for a number of wireless devices in a cell of a macro node being associated with the low power node, if the operation mode of the low power node is changed to active mode.

10. The method of claim 1, wherein the determining the operation mode of the low power node is based on a difference in power consumption of the low power node with regard to the active and the passive mode.

11. The method of claim 1, wherein the determining the operation mode of the low power node is based on a frequency band by means of which the wireless device(s) is/are associated with a macro node.

12. The method of claim 1, wherein the determining the operation mode of the low power node is performed at different time intervals; at different times during a day and night; and/or at the reception of any measurement report from any wireless device comprising a measurement with regards to the low power node.

13. The method of claim 1, wherein the network node is a macro node being in control of the low power node.

14. The method of claim 1, wherein the network node is a Radio Network Controller in control of the low power node.

15. The method of claim 1, wherein the network node is comprised in an Operation, Administration, and Maintenance system.

16. A network node for controlling operation of a low power node, the network node and the low power node being operable in a wireless communication network, wherein the low power node has at least two modes of operation including an active mode where the low power node is in full operation and a passive mode where the low power node is discoverable by wireless devices in the network but not available for initial access or incoming handovers, the network node comprising:
  processing circuitry;
  memory containing instructions executable by the processing circuitry whereby the network node is operative to:
    receive a measurement report from at least one wireless device, the measurement report comprising results from measurements performed on signals received by the wireless device from the low power node;
    determine the operation mode of the low power node based on the received measurement report; and
    change, when the current operation mode of the low power node is passive and the determined operation mode is active, the operation mode of the low power node to active mode.

17. The network node of claim 16, wherein the instructions are such that the network node is operative to determine the operation mode of the low power node based on a relationship between the received signal strength associated with the low power node versus the received signal strength associated with a macro node.

18. The network node of claim 16, wherein the instructions are such that the network node is operative to determine the operation mode of the low power node based on the number of wireless devices from which measurement reports comprising measurements with regards to the low power node have been received.

19. The network node of claim 16, wherein the instructions are such that the network node is operative to determine the operation mode of the low power node based on the frequency with which measurement reports are received.

20. The network node of claim 16, wherein the instructions are such that the network node is operative to determine the operation mode of the low power node based on Quality of Service parameters of the wireless device from which the measurement report is received.

21. The network node of claim 16, wherein the instructions are such that the network node is operative to determine the operation mode of the low power node based on a priority level of the wireless device(s) that sent the measurement report(s).

22. The network node of claim 16, wherein the instructions are such that the network node is operative to determine the operation mode of the low power node based on a current load of a macro node being associated with the low power node.

23. The network node of claim 16, a current Quality of Service state for a plurality of wireless devices in a cell of a macro node being associated with the low power node.

24. The network node of claim 16, wherein the instructions are such that the network node is operative to determine the operation mode of the low power node based on a potential capacity increase and/or enhancement of Quality of Service for a number of wireless devices in a cell of a macro node being associated with the low power node, if the operation mode of the low power node is changed to active mode.

25. The network node of claim 16, wherein the instructions are such that the network node is operative to determine the operation mode of the low power node based on a difference in power consumption of the low power node with regard to the active and the passive mode.

26. The network node of claim 16, wherein the instructions are such that the network node is operative to determine the operation mode of the low power node based on a frequency band by means of which the wireless device(s) is/are associated with a macro node.

27. The network node of claim 16, wherein the instructions are such that the network node is operative to determine the operation mode of the low power node at different time intervals; at different times during a day and night; and/or at the reception of any measurement report from any wireless device comprising a measurement with regards to the low power node.

28. The network node of claim 16, wherein the network node is a macro node being in control of the low power node.

29. The network node of claim 16, wherein the network node is a Radio Network Controller in control of the low power node.

30. The network node of claim 16, wherein the network node is comprised in an Operation, Administration, and Maintenance system.

31. A non-transitory computer readable recording medium storing a computer program product for controlling operation of a low power node, the low power node and a network node being operable in a wireless communication network, wherein the low power node has at least two modes of operation including an active mode where the low power node is in full operation and a passive mode where the low power node is discoverable by wireless devices in the network but not available for initial access or incoming handovers, the computer program product comprising software instructions which, when run on processing circuitry of the network node, causes the network node to:
  receive a measurement report from at least one wireless device, the measurement report comprising results from measurements performed on signals received by the wireless device from the low power node;
  determine the operation mode of the low power node based on the received measurement report; and
  change, when the current operation mode of the low power node is passive and the determined operation mode is active, the operation mode of the low power node to the active mode.

* * * * *